July 28, 1931.   L. A. PARADISE   1,816,492
COUPLING KEY
Filed March 17, 1926
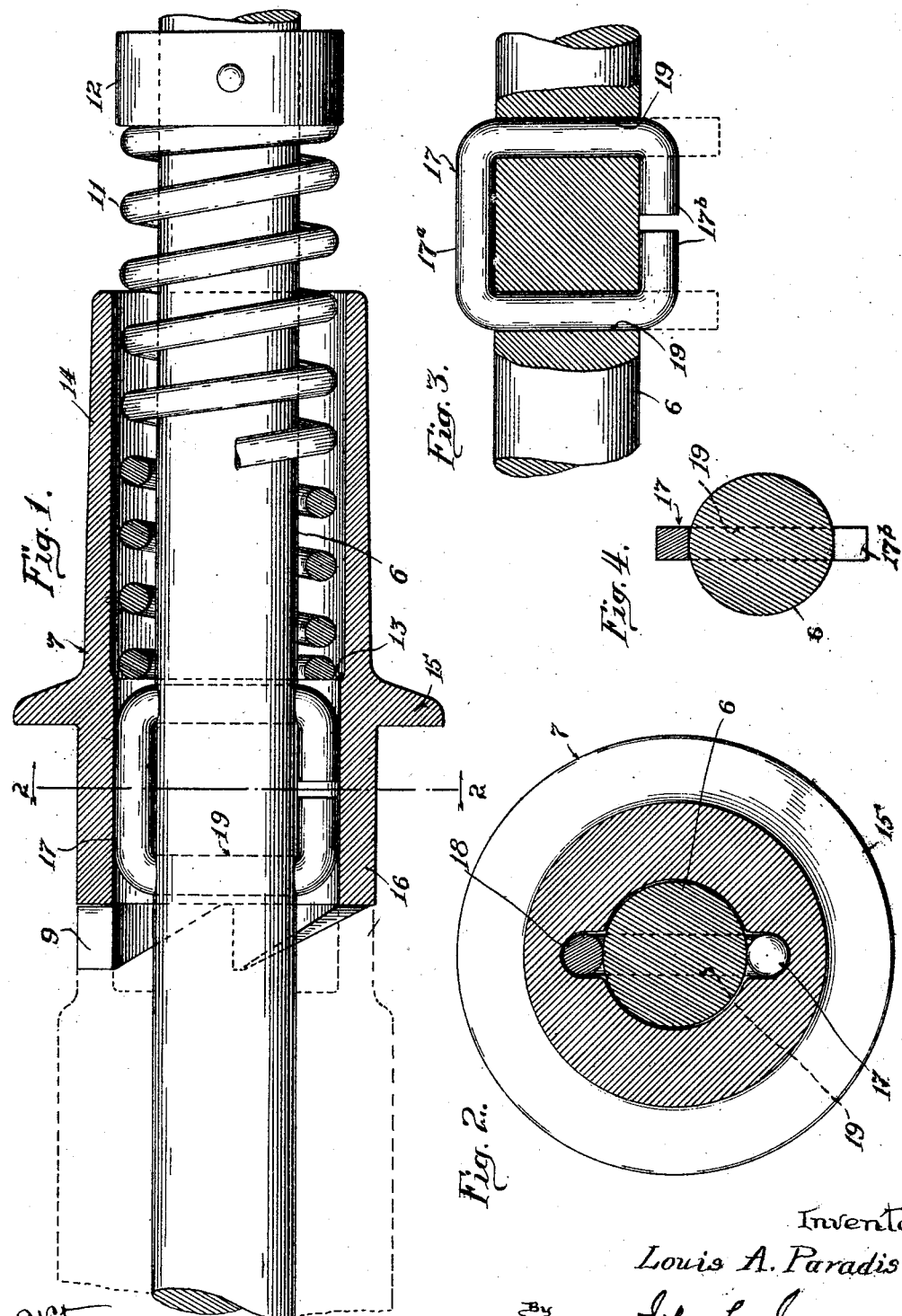
Inventor
Louis A. Paradise
By John L. Jackson,
Attorney
Witness
Milton Lenoir Patented July 28, 1931

1,816,492

UNITED STATES PATENT OFFICE

LOUIS A. PARADISE, OF MOLINE, ILLINOIS, ASSIGNOR TO DEERE & COMPANY, OF MOLINE, ILLINOIS, A CORPORATION OF ILLINOIS

COUPLING KEY

Application filed March 17, 1926. Serial No. 95,177.

The present invention relates to coupling keys for coupling two rotatable elements together, such as a shaft and sleeve, or two sleeves. The present coupling key can be employed to establish a driving relation between two rotatable elements which have rotatable motion only, or it can be used to establish a splined connection between two rotatable elements which have relative shifting movement therebetween, such as a shaft and clutch element.

One of the principal objects of the invention is to provide a simple and inexpensive coupling key which can be constructed from material of stock section without the necessity of performing any machining operations thereon; also to provide such a coupling key which will avoid the necessity of accurate or expensive machining operations on the rotary element to which it is to be secured.

Further objects are to provide a coupling key which will have maximum strength against shearing; which will be fixedly held to its respective rotary element so that it can not drop out of place; which will facilitate its own insertion into the key ways of the companion element; and which can be readily replaced from stock material in the event of damage thereto.

Referring to the accompanying drawings, in which I have illustrated one embodiment of my invention:

Figure 1 is a longitudinal sectional view through a shifting clutch, representative of one type of mechanism to which the present coupling key has particular application;

Fig. 2 is a transverse sectional view through this clutch, taken on the plane of line 2—2 of Fig. 1;

Fig. 3 is a fragmentary view illustrating a portion of the shaft broken away to show the mounting of the coupling key; and Fig. 4 is a transverse sectional view through the shaft and key illustrating a slightly different form of key.

The advantages of the present coupling key are perhaps realized to the fullest extent in coupling machine elements which have relative shifting motion as well as rotary motion, and accordingly, in Fig. 1 I have shown this coupling key serving to couple a jaw clutch to a shaft, these being typical of machine elements having rotary and relative reciprocatory movement. As before stated, however, the present coupling key can also be used to advantage where the two rotary elements have no relative shifting movement and the key may also be used to couple two concentric elements for transmitting thrusting motion therebetween.

In the construction shown in Fig. 1, one rotary element 6 consists of a solid shaft and the other rotary element 7 consists of a shiftable clutch collar or sleeve. One end of this clutch element 7 has jaw teeth 9 formed therein for cooperation with similar jaw teeth on a cooperating clutch element indicated in dotted lines. A spring 11 normally tends to thrust these teeth into clutching engagement, this spring bearing at one end against a collar 12, pinned to the shaft 6, and at the other end bearing against a shoulder 13 within the extending sleeve portion 14 of the clutch element 7. An angular flange 15 projecting outwardly from the clutch element constitutes a thrusting surface against which a shifting fork or other shifting member can engage. The clutch 7 has bearing support on the shaft 6 in a solid boss portion 16 extending from the shoulder 13 to the base of the toothed end 9. The present coupling key 17 effects coupling engagement between this boss portion 16 and the shaft 6.

Two longitudinal key-ways 18 are formed in this boss 16 at diametrically opposite points of its bore. In the embodiment shown in Figs. 1 and 2, these key-ways are of circular cross section, as best shown in Fig. 2. The key 17 projects from opposite sides of the shaft 6 and occupies both of these key-ways. The key consists of a length of bar or rod of round stock section, preferably of hardened steel. For receiving this key two holes 19 are drilled diametrically through the shaft 6 at points spaced sufficiently far apart to give the desired length of key surface along the shaft. In adapting the key to reception in these holes, the key is bent into substantially U-shaped or staple outline, as indicated by the dotted line extensions in Fig. 3, and these extensions or side portions are then forced down through the spaced holes 19. After the end portion 17a of the key has been forced into snug engagement with the shaft, the two ends projecting from the opposite side of the shaft are bent over to extend towards each other. This rigidly clenches the key in the shaft so that there is no possibility of its falling out of place in the assembly or disassembly of the elements 6 and 7. The upper intermediate cross portion 17a and the inwardly bent ends 17b thus constitute two diametrically opposite key projections for engaging in the two key-ways 18—18.

It will be observed that the completed key has a shearing strength equal to four times the shearing strength of its sectional thickness, this being obvious from the fact that before the key function can be destroyed the four sections of the key projecting from the holes 19 must all be sheared simultaneously. By reason of this factor of shearing strength, the stock from which the key is made can be of smaller diameter than would otherwise be possible, which is advantageous in that it permits of the use of holes 19 of smaller diameter so that the torsional strength of the shaft 6 is not reduced materially. The rounded ends and sides of this type of key facilitate the insertion of the key in the key-ways 18 during the assembly of the clutch and shaft.

The key can also be constructed of stock of square or rectangular cross section, as shown in Fig. 4. A key constructed of stock of this cross section will have a closely fitting engagement with key-ways of rectangular cross section. When using stock of rectangular cross section, the transverse holes 19 may be of rectangular or circular form, preferably the latter.

Having thus described my invention, what I claim as new and desire to secure by Letters Patent is:

1. In combination, two concentric elements having longitudinal movement relative to each other and adapted to have rotative motion transmitted from one to the other, and a key for coupling said elements together for transmitting such motion therebetween in either direction, consisting of a U-shaped member having its side portions extending through openings in the inner element and having its ends bent longitudinally of said inner element, the intermediate portion of said key and the ends thereof engaging in keyways in the outer element.

2. In combination, two concentric rotary elements adapted to have relative shifting movement therebetween, the outer rotary element having diametrically opposite keyways formed therein and the inner rotary element having two longitudinally spaced diametrical holes passing therethrough, and a key for transmitting such shifting movement between said elements, said key being constructed of a section of stock bar of U-shaped form having its side portions passing through said diametrical holes and having its ends bent longitudinally of said inner element and extending towards each other, the intermediate portion of said key and the ends thereof engaging in said keyways of the outer element.

3. The combination of a shaft and a shiftable sleeve mounted thereon and a coupling key for holding said shiftable sleeve against relative rotation, said key comprising a substantially U-shaped member having side portions passing through transverse holes in said shaft and having portions engaging in two diametrically opposite keyways in the shiftable sleeve.

4. The combination of two rotatable elements, and a coupling key for holding said elements against relative rotation, said key comprising a member extending transversely through one of said elements and having two lateral leg portions extending longitudinally thereof and engaging keyways in the other element.

5. The combination of two overlapping concentric rotatable elements, and a coupling key for holding said elements against relative rotation, said key comprising a member extending transversely through the inner element and having lateral portions extending longitudinally thereof and engaging in keyways in the outer element, said outer element being longitudinally movable along said key while in rotatable actuation.

6. In combination, two concentric elements adapted to have rotative motion transmitted from one to the other, and a key coupling said elements together for transmitting such motion consisting of a substantially U-shaped member having side portions extending through transverse openings in the inner of said elements and having projecting ends extending longitudinally of said element and toward each other, said ends engaging in a keyway extending longitudinally of the outer element.

7. The combination with an inner shaft element and an outer sleeve element adapted to be keyed together against relative rotation, of a key constructed of a single length of stock and comprising an intermediate portion adapted to extend lengthwise of the shaft element, two side portions extending substantially at right angles to said intermediate portion and passing entirely through two substantially diametrical, longitudinally spaced holes in said shaft element, and two end portions extending lengthwise of the shaft element substantially parallel with said intermediate portion, said intermediate portion and said two end portions projecting outwardly from the surface of the shaft element and affording two separate key surfaces engaging in two associated keyways in said sleeve element, said two end portions positively locking said key in said shaft element against accidental dislodgment when said shaft and sleeve elements are separated.

8. The combination of two rotatable elements and a coupling key permanently secured in one of said elements and engaging in diametrically opposite keyways in the other element, said key consisting of a U-shaped member comprising an intermediate portion, and side portions extending entirely through openings in the inner element, the end of one of said side portions extending lengthwise of the inner element substantially parallel with said intermediate portion but on the other side of said inner element whereby said intermediate portion and said end portion both function as torque transmitting key portions, and whereby said end portion positively prevents said key from becoming accidentally disengaged from the inner element.

9. The combination of two rotatable elements having longitudinal movement relative to each other and a coupling key for holding said elements against relative rotation, said coupling key comprising a substantially U-shaped member having side portions extending through transverse openings in one of said elements, and an intermediate portion engaging in a keyway extending longitudinally of the other element, the projecting ends of said side portions extending into a second longitudinal keyway in said last named element.

LOUIS A. PARADISE.